United States Patent
Osawa

(10) Patent No.: US 9,538,028 B2
(45) Date of Patent: Jan. 3, 2017

(54) IMAGE PROCESSING APPARATUS CONFIGURED TO PROVIDE VOICE GUIDED OPERATION, METHOD OF CONTROLLING AN IMAGE PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Takaharu Osawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/873,443

(22) Filed: Oct. 2, 2015

(65) Prior Publication Data

US 2016/0105576 A1    Apr. 14, 2016

(30) Foreign Application Priority Data

Oct. 10, 2014  (JP) ................. 2014-209396

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |

(52) U.S. Cl.
CPC ...... *H04N 1/00488* (2013.01); *H04N 1/00244* (2013.01); *H04N 1/00413* (2013.01); *H04N 2201/0094* (2013.01)

(58) Field of Classification Search
CPC ............ H04N 1/00488; H04N 1/00244; H04N 1/00413; H04N 1/0094; G06K 15/02; G06F 3/1296; G06F 3/1297; G06F 3/1293
USPC ................................ 358/1.1, 1.15, 1.13, 1.14
See application file for complete search history.

(56) References Cited

U.S. PATENT DOCUMENTS

| | | | |
|---|---|---|---|
| 2003/0058866 A1* | 3/2003 | Kitayama | H04L 12/1881 370/394 |
| 2011/0054908 A1* | 3/2011 | Matsuda | G10L 15/26 704/275 |

FOREIGN PATENT DOCUMENTS

| | | |
|---|---|---|
| JP | 2005010992 A | 1/2005 |
| JP | 2006031273 A | 2/2006 |
| JP | 2008021108 A | 1/2008 |

* cited by examiner

*Primary Examiner* — Douglas Tran

(74) *Attorney, Agent, or Firm* — Rossi, Kimms & McDowell LLP

(57) ABSTRACT

A request for data of an operation screen is transmitted to a Web server, and as a response to the request, data of the operation screen, which includes a plurality of components is received from the Web server. The operation screen is displayed based on the received data of the operation screen, and one of the plurality of components in the displayed operation screen is designated in accordance with an operation by a user. Voice output is performed based on content of voice output associated with the designated component.

10 Claims, 11 Drawing Sheets

IMAGE PROCESSING APPARATUS

FIG. 9A

```
<link rel="stylesheet" href="voice.css" type="text/css"/>                  ~901

<input type="submit"                                                       ~902
  name="btnSelectImage"
  value="select image"
  id="btnSelectImage"  ~903
  id="ExecuteButton"/>

<input type="submit"
  name="btnOthers"
  value="detail"
  id="Detail"/>
```

FIG. 9B

```
<head> <style>                                                             ~911
  ExecuteButton {voice : select image}  ~912
  RegisterButton {voice : registration </style> ...
```

IMAGE PROCESSING APPARATUS CONFIGURED TO PROVIDE VOICE GUIDED OPERATION, METHOD OF CONTROLLING AN IMAGE PROCESSING APPARATUS, AND NON-TRANSITORY COMPUTER-READABLE STORAGE MEDIUM

BACKGROUND OF THE INVENTION

Field of the Invention

The present invention relates to an image processing apparatus capable of displaying an operation screen obtained from a server, a method of controlling the image processing apparatus, and a non-transitory computer-readable storage medium.

Description of the Related Art

In recent years, a system that uses voice synthesis to support operations in various situations, such as character input on a personal computer (PC), information retrieval on a car navigation system or a smart phone, voice guidance on a facsimile machine, has been investigated. These target various users, including vision-impaired users, elderly users, or the like.

To support operation of an MFP (Multi Function Peripheral), an apparatus that performs an operation explanation that uses voice synthesis has been investigated. Specifically, by operating a numeric keypad in an operation unit of the MFP, focus is moved to various buttons in the operation screen, and reading out loud of a focused portion is performed (Japanese Patent Laid-Open No. 2006-31273).

Meanwhile, connecting an information processing apparatus, such as a PC, to a Web server on a network, and displaying an operation screen provided by the Web server on a Web browser that the information processing apparatus is provided with is known.

In such a case, first the Web browser of the information processing apparatus performs a request for the operation screen towards the Web server. Then, a Web application on the Web server responds to the information processing apparatus with HTML (HyperText Markup Language) data for displaying the operation screen on the Web browser, in response to the request from the information processing apparatus. The Web browser of the information processing apparatus analyzes the received HTML data, and displays the operation screen based on the description of the HTML data.

Furthermore, when a user inputs an instruction via an operation screen displayed on the Web browser, the Web browser notifies the Web server of the input instruction. The Web application on the Web server, having received this notification, executes processing in accordance with the input instruction.

Among MFPs, there is an MFP that is provided with a Web browser such as is described above. Such an MFP uses the above described procedure to display the operation screen provided by the Web server on the Web browser of the MFP, and accept various instructions from the user. A system in which the operation screen, which inputs instructions for using functions that the MFP provides, is provided to the Web server, and the user inputs instructions to the MFP via the operation screen displayed on the Web browser is being considered.

In a Web browser on a PC, as a tool for improving accessibility for vision-impaired users, software called a screen reader is provided (Japanese Patent Laid-Open No. 2005-10992). The screen reader outputs voice in accordance with detail of a display document (in other words, the displayed content is read out loud). Accordingly, vision-impaired users can operate by themselves an application or the like according to the voice that is read out loud by the screen reader.

In a display document displayed by the Web browser on the MFP, details read out loud by the screen reader become cumbersome because HTML tags included in the display document or the like are read out loud unchanged, and it may be difficult for the user to grasp the details of the display document. Therefore, in a technique such as Japanese Patent Laid-Open No. 2008-21108, an explanatory sentence is prepared separately, and by reading it out loud, it is possible to make it easier to understand by voice output of the displayed content of a Web page.

As in Japanese Patent Laid-Open No. 2006-31273, operation that uses a numeric keypad is realized in the MFP. Meanwhile, while reading out loud via a voice has been realized as in a screen reader in a Web browser on a PC, this not suitable to a Web browser accompanying operation of an application on an MFP. A voice read-out that corresponds to operation of a Web browser on the MFP via a numeric keypad or the like has not been realized. Accordingly, for a user of an MFP, there is a difference between operation of an application corresponding to voice read-out and operation of the application via the Web browser, and there is a problem from an aspect of usability. In addition, for the user, confusion is introduced by the difference in operation.

SUMMARY OF THE INVENTION

The present invention was conceived in view of these problems, and provides a technique for realizing voice output concerning an operation screen obtained from a server.

According to the first aspect of the present invention, there is provided an image processing apparatus comprising: a transmission unit configured to transmit a request for data of an operation screen to a Web server; a reception unit configured to receive from the Web server, as a response to the request, the data of the operation screen, which includes a plurality of components, wherein the data of the operation screen includes data that associates the component and content of voice output; a display control unit configured to display the operation screen based on the data of the operation screen that the reception unit received; a designating unit configured to designate one of the plurality of components in the displayed operation screen in accordance with an operation by a user; and a voice output unit configured to perform a voice output based on content of voice output associated with the component designated by the designating unit.

According to the second aspect of the present invention, there is provided a method of controlling an image processing apparatus, the method comprising: transmitting a request for data of an operation screen to a Web server; receiving from the Web server, as a response to the request, the data of the operation screen that includes a plurality of components, wherein the data of the operation screen includes data that associates the component and content of voice output; displaying the operation screen based on the received data of the operation screen; designating one of the plurality of components in the displayed operation screen in accordance with an operation by a user; and performing voice output based on content of voice output associated with the designated component.

According to the third aspect of the present invention, there is provided a non-transitory computer-readable storage medium that stores a program for causing a computer to execute a method of controlling an image processing apparatus, wherein the program causes the computer to execute: transmitting a request for data of an operation screen to a Web server; receiving from the Web server, as a response to the request, the data of the operation screen that includes a plurality of components, wherein the data of the operation screen includes data that associates the component and content of voice output; displaying the operation screen based on the received data of the operation screen; designating one of the plurality of components in the displayed operation screen in accordance with an operation by a user; and performing voice output based on content of voice output associated with the designated component.

Further features of the present invention will become apparent from the following description of exemplary embodiments (with reference to the attached drawings).

BRIEF DESCRIPTION OF THE DRAWINGS

FIGS. 9A and 9B are views for illustrating example configurations of HTML data and CSS data.

DESCRIPTION OF THE EMBODIMENTS

Embodiments of the present invention will be described hereinafter in detail, with reference to the accompanying drawings. Note that embodiments described below merely illustrate examples of specifically implementing the present invention, and are only specific embodiments of a configuration defined in the scope of the claims.

[First Embodiment]

Figure 1:
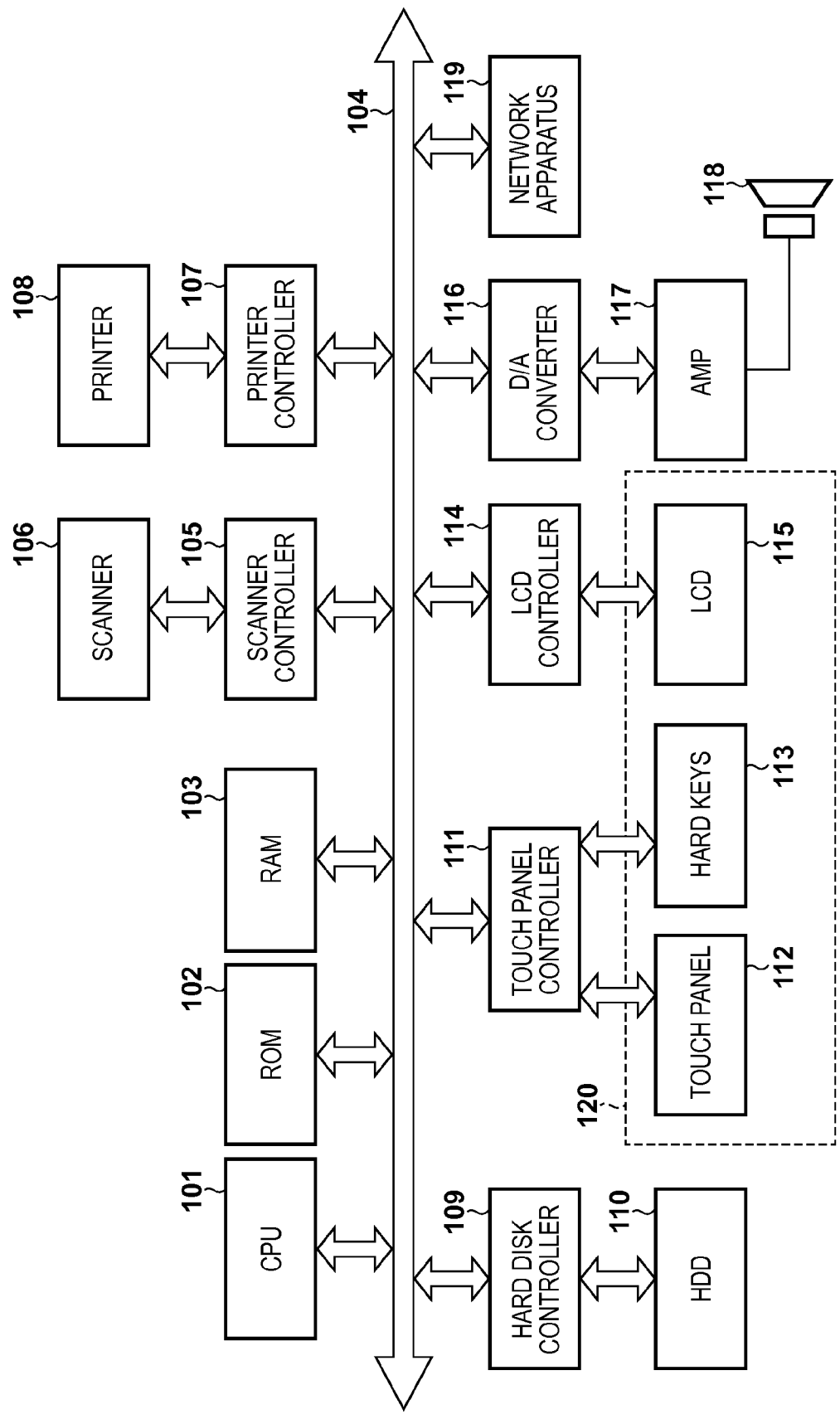
FIG. 1 is a block diagram for showing an example of a hardware configuration of an image processing apparatus.

According to this embodiment, explanation is given for an image processing apparatus applied to an MFP (Multi Function Peripheral). Firstly, a block diagram of FIG. 1 is used to explain a hardware configuration example of the image processing apparatus according to the present embodiment. Note that the hardware configuration shown in FIG. 1 is merely one example of a configuration capable of realizing each process explained later as performed by the image processing apparatus, and any configuration may be used if it a configuration capable of realizing processing that is equivalent or exceeding each process explained later as performed by the image processing apparatus.

By a CPU 101 using a computer program or data stored in a RAM 103 or a ROM 102 to execute processing, in addition to performing operation control of each unit that configures the image processing apparatus, each process that is explained later as something that the image processing apparatus performs is executed.

The ROM 102 stores setting data of the image processing apparatus, a boot program, or a computer program or data for causing the CPU 101 to execute or control each process explained later as something that the image processing apparatus performs, or the like. The computer program or data stored in the ROM 102 is appropriately loaded into the RAM 103 in accordance with control by the CPU 101, and becomes a target of processing by the CPU 101.

The RAM 103 has an area for storing data of a scan image sent from a scanner 106, a computer program or data loaded from an HDD (hard disk drive) 110, data that a network apparatus 119 received from an external apparatus, or the like. The RAM 103 also has a work area used when the CPU 101 executes various processing. In this way, the RAM 103 can appropriately provide various areas.

A scanner controller 105 is for performing operation control of the scanner 106 in accordance with a scan setting, set by the user operating an operation unit 120, or the like. As known, the scanner 106 is an apparatus that reads information recorded on a storage medium such as paper as an image (a scan image), and the data of the image read by the scanner 106 is sent to the RAM 103 or the HDD 110 via the scanner controller 105.

A printer controller 107 is for performing operation control of a printer 108, in accordance with a print setting, set by the user operating the operation unit 120, or the like. As is conventional, the printer 108 is a device for recording an image or text on a recording medium such as paper, based on print data received via the printer controller 107. A method of printing by the printer 108 is not limited to a specific method. For example, for the method of printing, any method may be employed, such as an electrophotographic method that uses a photosensitive drum, a photosensitive belt, or the like; an ink-jet method that directly prints an image on a sheet by discharging ink from a minute nozzle array; or the like.

A hard disk controller 109 is for performing operation control of the HDD 110, and controls reading/writing of information from/to the HDD 110. The HDD 110 saves an OS (operating system), or various computer programs or data. Data saved in the HDD 110 includes various data described later as held by the image processing apparatus. The HDD 110 may save all or a portion of a computer programs, data, or the like, described above as things that are stored in the ROM 102 or the RAM 103. The computer program or data stored in the HDD 110 is appropriately loaded into the RAM 103 in accordance with control by the CPU 101, and becomes a target of processing by the CPU 101.

A touch panel controller 111 is for performing operation control of a touch panel 112, detects a user operation with respect to the touch panel 112, and communicates a detected result to the CPU 101.

An LCD controller 114 is for performing operation control of an LCD 115, and causes a result of processing by the CPU 101 to be displayed on the LCD 115 by using an image or text.

The operation unit 120 has the touch panel 112, hard keys 113, and the LCD 115, and is for accepting an operation input from a user and performing an information display to the user.

As is conventional, the touch panel 112 is arranged on a viewing surface of the LCD 115, accepts a touch operation from a user, and detects and communicates to the CPU 101 a touch position (coordinates) on the LCD 115.

Figure 2:
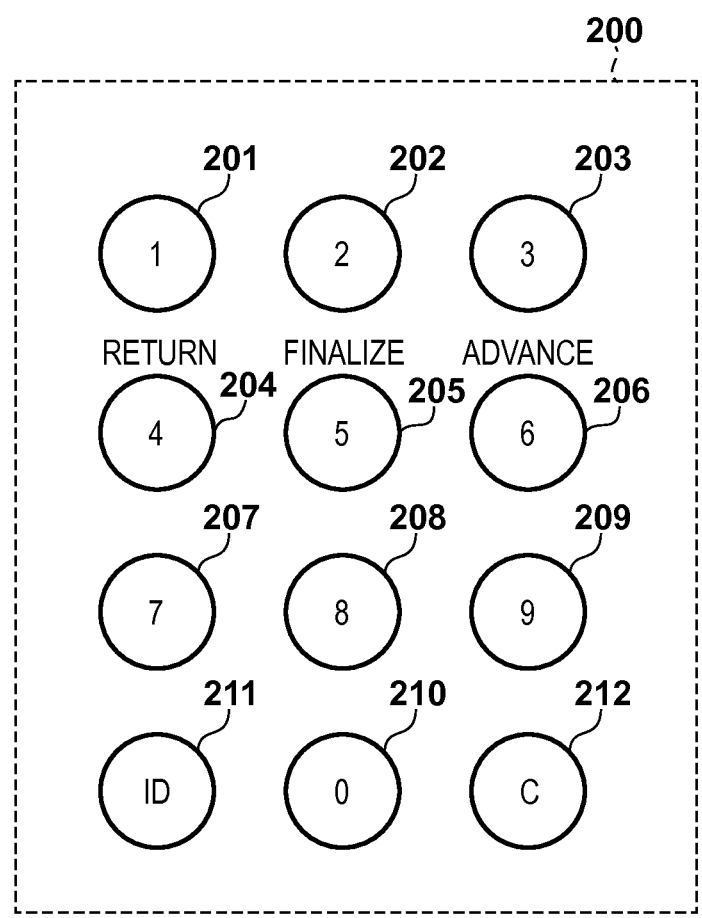
FIG. 2 is a view showing hard keys 113.

As is conventional, the hard keys 113 are a group of buttons that are pressable by a user, and for example, are provided as buttons 201-212 as shown in FIG. 2. The buttons 201-209, and 210 are buttons (a numeric keypad) for performing numeric value input, and when pressed by a user can input "1" to "9" and "0", respectively. A physical protruding object is arranged on a face of the button 205 that is positioned approximately in the center of the numeric keypad group, and through this protruding object and a typical the button arrangement, by relying on a sense of touch even a vision-impaired user, or the like, can handle the numeric keypad. The numeric keypad may also be used as keys for shifting which button (a software key) displayed on the LCD 115 is focused. For example, the button 204 may be used as a button for shifting (returning) the focus in a backward direction, and the button 206 may be used as a button for shifting (advancing) the focus in a forward direction.

A button 211 is a button that the user presses to input a user ID, and a button 212 is a button that the user presses to clear an input numeric value. Note that the configuration of the hard keys 113 and buttons included in the hard keys 113 are not limited to those shown in FIG. 2, and various variations may be considered.

A D/A converter 116 converts a digital voice signal into an analog voice signal, based on digital voice data. An AMP 117 causes amplification of the analog voice signal converted by the D/A converter 116, and sends it to a speaker 118. The speaker 118 outputs a voice based on the analog voice signal from the AMP 117.

The network apparatus 119 is for performing data communication with the external apparatus. Each of the CPU 101, the ROM 102, the RAM 103, the scanner controller 105, the printer controller 107, and the hard disk controller 109 are connected to a bus 104. The touch panel controller 111, the LCD controller 114, the D/A converter 116, and the network apparatus 119 are also connected to the bus 104.

Figure 3:
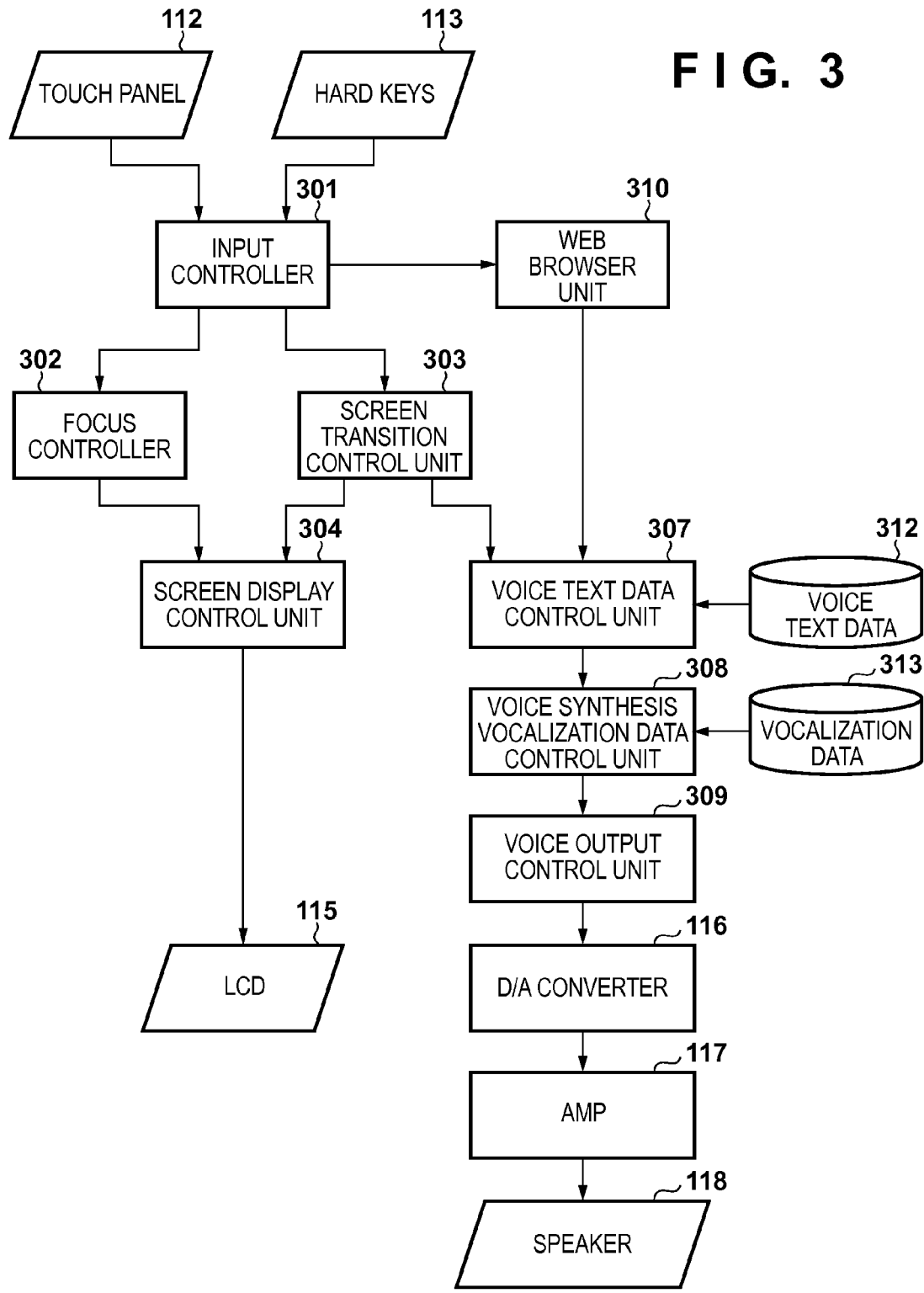
FIG. 3 is a block diagram for showing an example of a functional configuration of the image processing apparatus.

Next, a block diagram of FIG. 3 is used to explain a functional configuration example of the image processing apparatus according to the present embodiment. Note that in FIG. 3, functional units other than the functional units shown in FIG. 1 may be configured as hardware, or may be configured as software. Two or more functional units may be collected as one functional unit. In this embodiment, explanation is given for a case in which functional units in FIG. 3 other than functional units shown in FIG. 1 are implemented through software. In such a case, by the CPU 101 executing the software, a function of the corresponding functional unit is realized.

An input controller 301 detects input of an operation on the touch panel 112, the hard keys 113, or the like. For example, if the user has touched on the touch panel 112, the input controller 301 determines whether a touched position is within a display region of a software key displayed on the LCD 115. For example, if the user operates the above-described numeric keypad included in the hard keys 113 and causes the focus to shift, the input controller 301 determines the software key corresponding to the shifted focus.

A Web browser unit 310 will be explained later.

A focus controller 302 manages a focus target of software keys displayed on the LCD 115, and notifies a screen display control unit 304 so as to highlight the software key that is the current focus target. For example, if the input controller 301 determines that the user has touched within in a display region of a software key of interest from the software key group displayed on the LCD 115, the focus controller 302 controls as follows. Specifically, in addition to managing the software key of interest as the focus target, the focus controller 302 communicates to the screen display control unit 304 so as to highlight the software key of interest. Also, if the input controller 301 has determined that the user has operated the above-described numeric keypad to shift the focus the software key of interest, the focus controller 302 controls similarly.

A screen transition control unit 303 communicates to the screen display control unit 304 so that the screen currently displayed on the LCD 115 transitions to a screen corresponding to input of an operation on the hard keys 113 or the touch panel 112.

The screen transition control unit 303 manages whether a focus mode or a non-focus mode is set. A method of setting the focus mode and the non-focus mode is not limited to a specific method of setting, but in this embodiment, if the user has pressed the button 212 for a predetermined time or more, a currently set mode is switched to another mode. For example, if, in a state in which a focus mode is currently set, the user presses the button 212 for the predetermined time or more, the non-focus mode is transitioned into. However, if, in a state in which the non-focus mode is currently set, the user presses the button 212 for the predetermined time or more, the focus mode is transitioned into. For an operation corresponding to such mode transitioning, any method may be used, such as performing the operation by using a dedicated key, but operation that uses a hardware key or a physical switch instead of a software key is desirable. Details of the focus mode and the non-focus mode are explained later.

Upon receiving notification of the screen transition from the screen transition control unit 303, the screen display control unit 304 transitions the screen displayed on the LCD 115 to a screen corresponding to the input of the operation on the touch panel 112 or the hard keys 113. In accordance with the notification from the focus controller 302, the screen display control unit 304 highlights the software key that is the focus target, out of those of the software key group displayed on the LCD 115. There are various methods of highlighting, and any method may be employed. For example, a border may be added to the software key that is the focus target, some kind of mark may be added near the software key that is the focus target, or the color of the software key that is the focus target may be caused to change or blink.

As an explanation of the software key that is the focus target, a voice text data control unit 307 obtains text data, which is suitable for voice read-out, from voice text data 312. The voice text data 312 includes text data, which is generated in advance for several of the respective software keys that can be displayed on the LCD 115, and explanation of these is read out loud as a voice. Note that, as an explanation of the software key that is the focus target, the voice text data control unit 307 may obtain text data, which is suitable for a voice read-out loud, from the Web browser unit 310 instead of the voice text data 312. The voice text data control unit 307 then sends the obtained text data to a voice synthesis vocalization data control unit 308.

The voice synthesis vocalization data control unit 308 uses vocalization data 313, which includes vocalization data of each phoneme, to generate by voice synthesis voice waveform data for reading out loud the explanation, based on text data received from the voice text data control unit 307. The voice synthesis vocalization data control unit 308 then sends the generated voice waveform data to a voice output control unit 309. The voice output control unit 309 sends the voice waveform data received from the voice synthesis vocalization data control unit 308 to the D/A converter 116.

The D/A converter 116 converts a digital voice signal based on the voice waveform data received from the voice output control unit 309 to an analog voice signal, and sends the converted analog voice signal to the AMP 117. The AMP 117 causes amplification of the analog voice signal received from the D/A converter 116, and sends it to the speaker 118.

Figure 4:
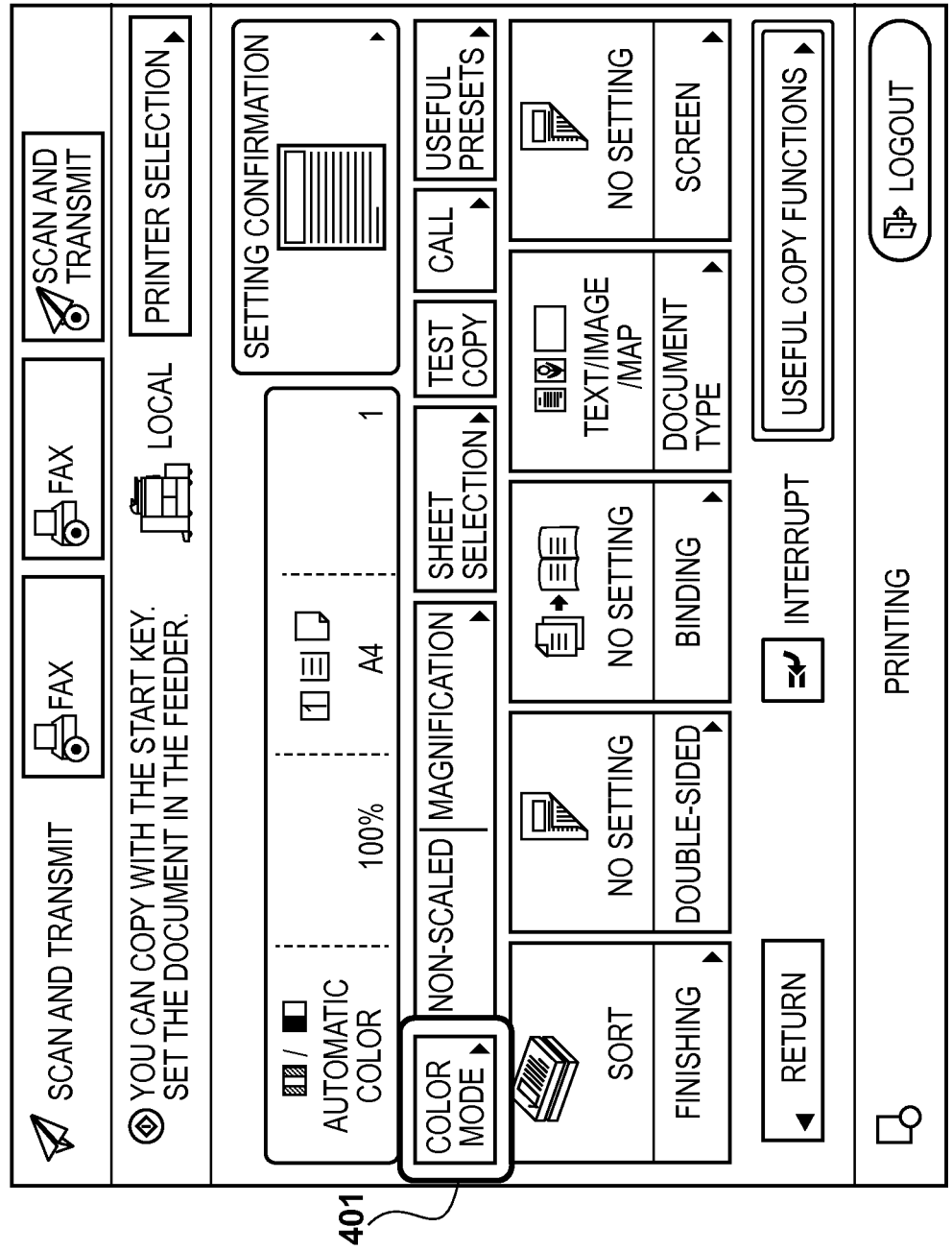
FIG. 4 is the view for illustrating an example of a screen displayed on an LCD 115.

Here, an example of a screen displayed on the LCD 115 when the focus mode is set is shown in FIG. 4. In FIG. 4, a software key for designating a "color mode" is the focus target. Therefore, to indicate that this software key is the focus target, the software key is displayed with a border 401 added thereto, and thus the software key is highlighted. As above, this border 401 can be moved by the numeric keypad. In addition, configuration may be taken so as to instruct (finalize an instruction) the software key that is currently the focus target by pressing the button 205.

Here, in the focus mode, it is desirable to not just highlight the focus target software key, but also to read out loud by voice an explanation of the focus target software key. Examples of descriptive text read out loud by voice is as follows.

"Focus is on the non-scaled key."

"This is a key that sets the copy magnification to 100%."

When performing such voice output, a display region for the "non-scaled key" and text data used for performing the voice read-out of "focus is on the non-scaled key" are associated and included in the voice text data 312. In addition, a display region for "key that sets the copy magnification to 100%" and text data used for performing voice read-out of "this is a key that sets the copy magnification to 100%." are associated, and included in the voice text data 312.

Figure 5:
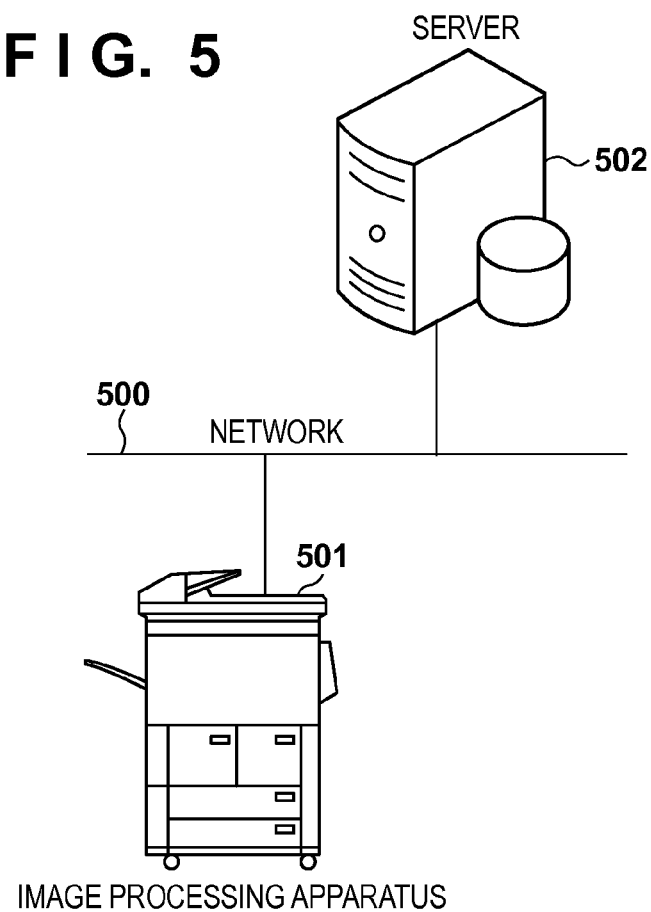
FIG. 5 is a view for illustrating an example of a system that includes the image processing apparatus.

Next, an example of the system that includes the image processing apparatus according to the present embodiment is shown in FIG. 5. In this embodiment, as shown in FIG. 5, an image processing apparatus 501 (the network apparatus 119) is connected to a server 502 via a network 500, and has a configuration in which data communication with each other is possible via the network 500. The network 500 may be an intranet, the Internet, or another network system, and may be wireless or wired. Also, it may be a combination of these.

The image processing apparatus 501 may be managed by a local IP address. In such a case, a gateway (not shown) is present between the network 500 and the image processing apparatus 501, and the gateway performs address translation. For example, a router is included in the gateway. The gateway or the image processing apparatus 501 may be equipped with a firewall function.

In such a configuration, the image processing apparatus 501 can transmit a request for transmission of an operation screen displayed on the LCD 115 to the server 502 via the network 500. Upon receiving the request for transmission, the server 502 transmits data of the operation screen in accordance with the request for transmission (response data) to the image processing apparatus 501 via the network 500. The image processing apparatus 501 generates a screen based on the response data transmitted from the server 502; in other words the operation screen requested of the server 502, and displays the generated operation screen on the LCD 115. Specifically, the image processing apparatus 501 has a so-called browser function that makes a request to the server 502 for the operation screen and displays the operation screen based on the response data transmitted from the server 502 in accordance with the request. The browser function is provided by the Web browser unit 310.

Figure 6:
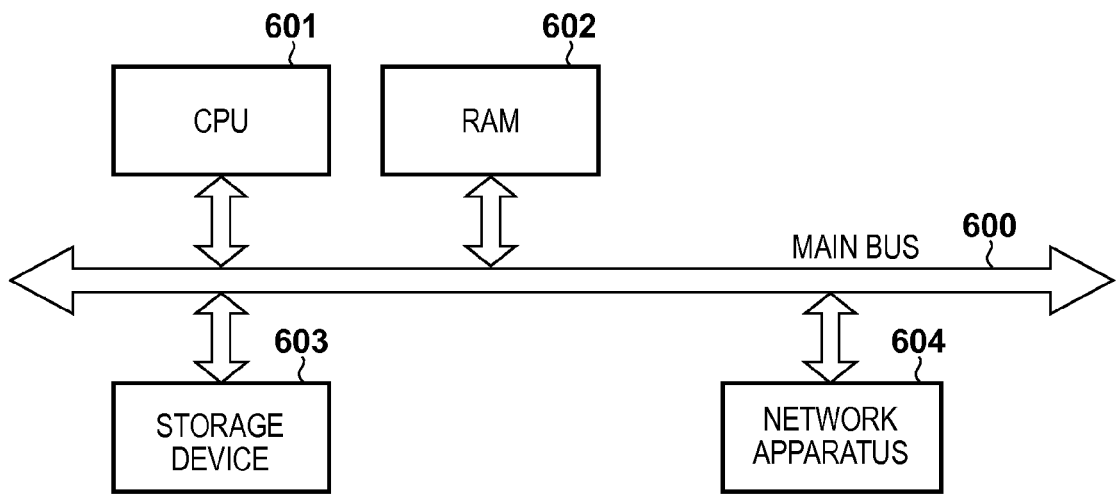
FIG. 6 is a block diagram for showing an example of a hardware configuration of a server 502.

Next, a block diagram of FIG. 6 is used to explain a hardware configuration example of the server 502. Note that a hardware configuration of the server 502 is not limited to a configuration shown in FIG. 6, and any configuration may be employed if the configuration can realize processing equivalent or exceeding processing that is described later as something that the server 502 performs.

By using a computer program or data stored in a RAM 602 to execute processing, a CPU 601 performs operation control of the server 502 overall, and also executes each process described later as performed by the server 502.

The RAM 602 has an area for storing data, a computer program, or the like, loaded from a storage device 603, and an area for storing data transmitted from the image processing apparatus 501 via a network apparatus 604. Furthermore, the RAM 602 also has a work area used when the CPU 601 executes various processing. In this way, the RAM 602 can appropriately provide various areas.

In the storage device 603, data or computer programs for causing the CPU 601 to execute the processes explained later as something that the OS or the server 502 performs is saved. Data saved in the storage device 603 includes various operation screen response data that can be provided to the image processing apparatus 501. The computer program or data stored in the storage device 603 is appropriately loaded into the RAM 602 in accordance with control by the CPU 601, and becomes a target of processing by the CPU 601.

The network apparatus 604 is for connecting the server 502 to the network 500, and the server 502 performs data communication with the image processing apparatus 501, which is connected to the network 500, via the network apparatus 604. Each module described above is also connected to a main bus 600.

Figure 7:
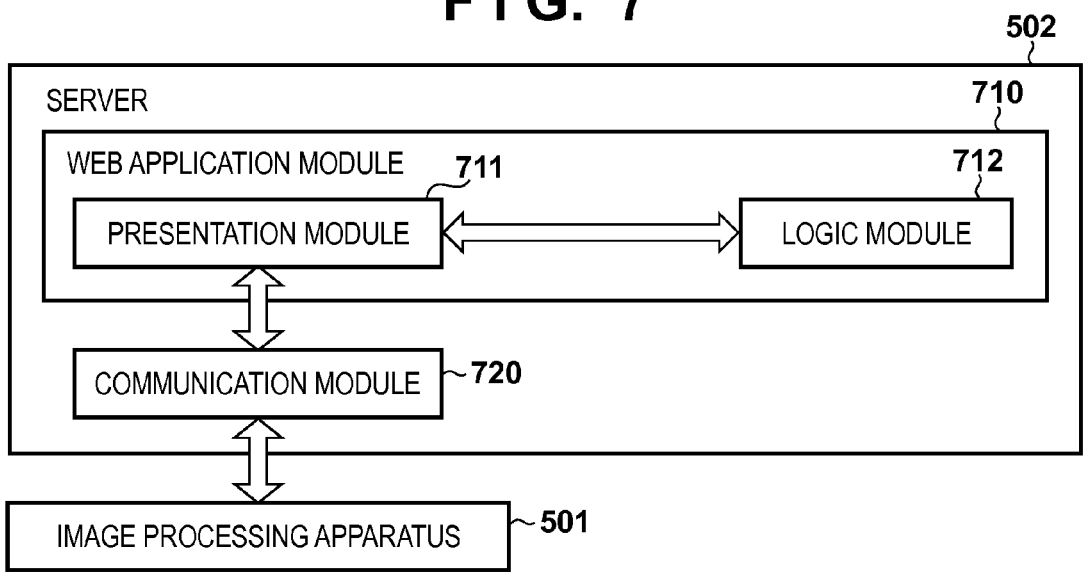
FIG. 7 is a block diagram for illustrating an example of a functional configuration of the server 502.

Next, a block diagram of FIG. 7 is used to explain a functional configuration example of the server 502. A Web application module 710 has a presentation module 711 and a logic module 712.

The presentation module 711 controls a communication module 720 to receive a request for transmission transmitted from the image processing apparatus 501 via the network 500, and transmits response data for an operation screen in accordance with the request for transmission to the image processing apparatus 501.

In a state in which the operation screen corresponding to the response data transmitted by the presentation module 711 is displayed on the LCD 115, when content for which the user has operated the operation screen is transmitted from the image processing apparatus 501, the logic module 712 controls as follows. In other words, the logic module 712 controls the communication module 720 to receive the detail, generates an instruction for modifying the operation screen in accordance with the received content, and then controls the communication module 720 to transmit the modification instruction to the image processing apparatus 501.

The communication module 720 controls the network apparatus 604 to perform data communication with the image processing apparatus 501 by using an HTTP protocol.

Figure 8:
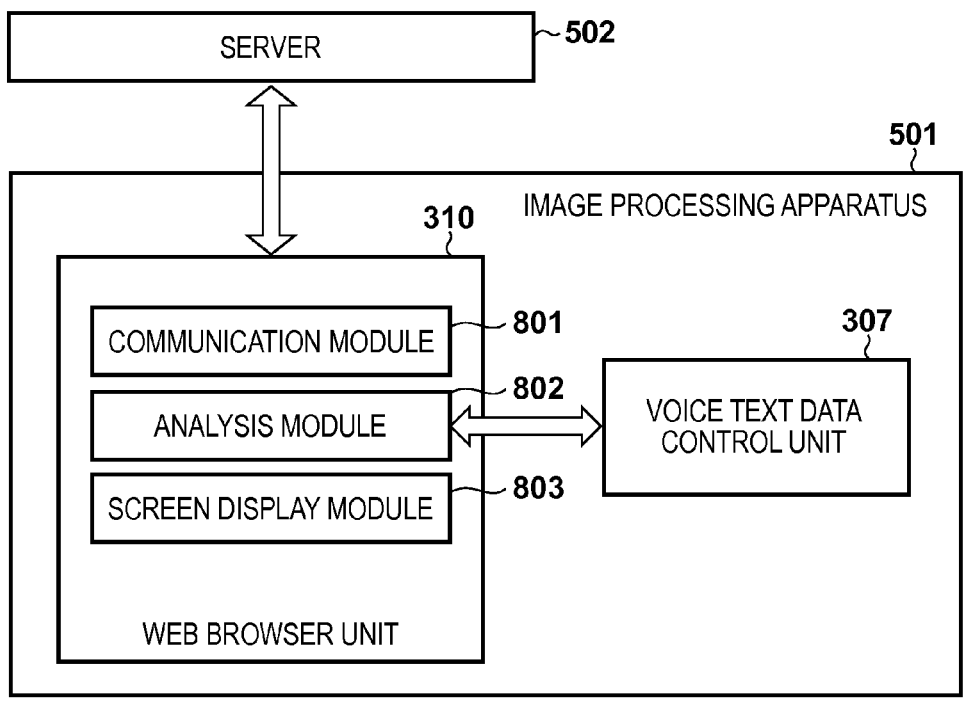
FIG. 8 is a block diagram for illustrating an example of a functional configuration of a Web browser unit 310.

Next, an example of a functional configuration of the Web browser unit 310 described above that the image processing apparatus 501 has is explained by using the block diagram of FIG. 8. The Web browser unit 310 has a communication module 801, an analysis module 802, and a screen display module 803. The Web browser unit 310 makes a request to the server 502 for an operation screen, generates and displays on the LCD 115 the operation screen based on response data transmitted from the server 502 in accordance with the request. Note that the Web browser unit 310 displays a screen based on response data received from an external unit, and is not limited to the server 502.

The communication module 801 communicate with the presentation module 711 of the Web application module 710 in accordance with the HTTP protocol, via the communication module 720 of the server 502. More specifically, the communication module 801 transmits the transmission request for the operation screen to be displayed on the LCD 115 to the server 502 via the network 500, and receives response data transmitted from the server 502 in accordance with the transmission request.

The analysis module 802 analyzes the response data that the communication module 801 receives from the server 502. The response data includes HTML data, which is a description that represents content of the operation screen, and CSS (Cascading Style Sheet) data for instructing in what way to display each element of the HTML data.

An example of the HTML data is shown in FIG. 9A. A CSS designation section 901 is a portion that designates corresponding CSS data; here, "voice.css" is designated. A button generation tag 902 is an example of a tag that generates a button that is displayed on the operation screen. Here the example generates a button that is displays "image selection", but limitation is not made to a button, and the type is irrelevant if it is a default HTML tag. In addition, an ID designation section 903 designates an ID (identification information) to the button that the button generation tag 902 generates.

An example of CSS data 911 designated by the CSS designation section 901 (voice.css) is shown in FIG. 9B. Here in a voice character string designation section 912, a voice read-out character string "image selection" is designated for an ID called "ExecuteButton" which is designated by the ID designation section 903.

The analysis module 802 refers to the CSS data 911 (voice.css) that is designated by the CSS designation section 901 in the HTML data in the response data. If the voice character string designation section 912 is present for the ID designated by the ID designation section 903 for the software key that is the focus target, the analysis module 802 extracts the character string "image selection" that is designated by "voice" in the voice character string designation section 912. The analysis module 802 sends the extracted the character string "image selection" to the voice text data control unit 307 as the above-described text data.

The analysis module 802 sends the HTML data to the screen display module 803 (also sends the CSS data as necessary). Note that the analysis module 802 adds a description that indicates potential to become a focus target to a software key that has a voice character string designation before sending it to the screen display module 803. Specifically, in the HTML data, a description for adding a border line, such as STYLE="border: 5px #ff0000 solid", to the description for the software key that has the voice character string designation.

The screen display module 803 generates the operation screen based on the HTML data received from the analysis module 802, and displays the generated operation screen on the LCD 115.

Figure 10:
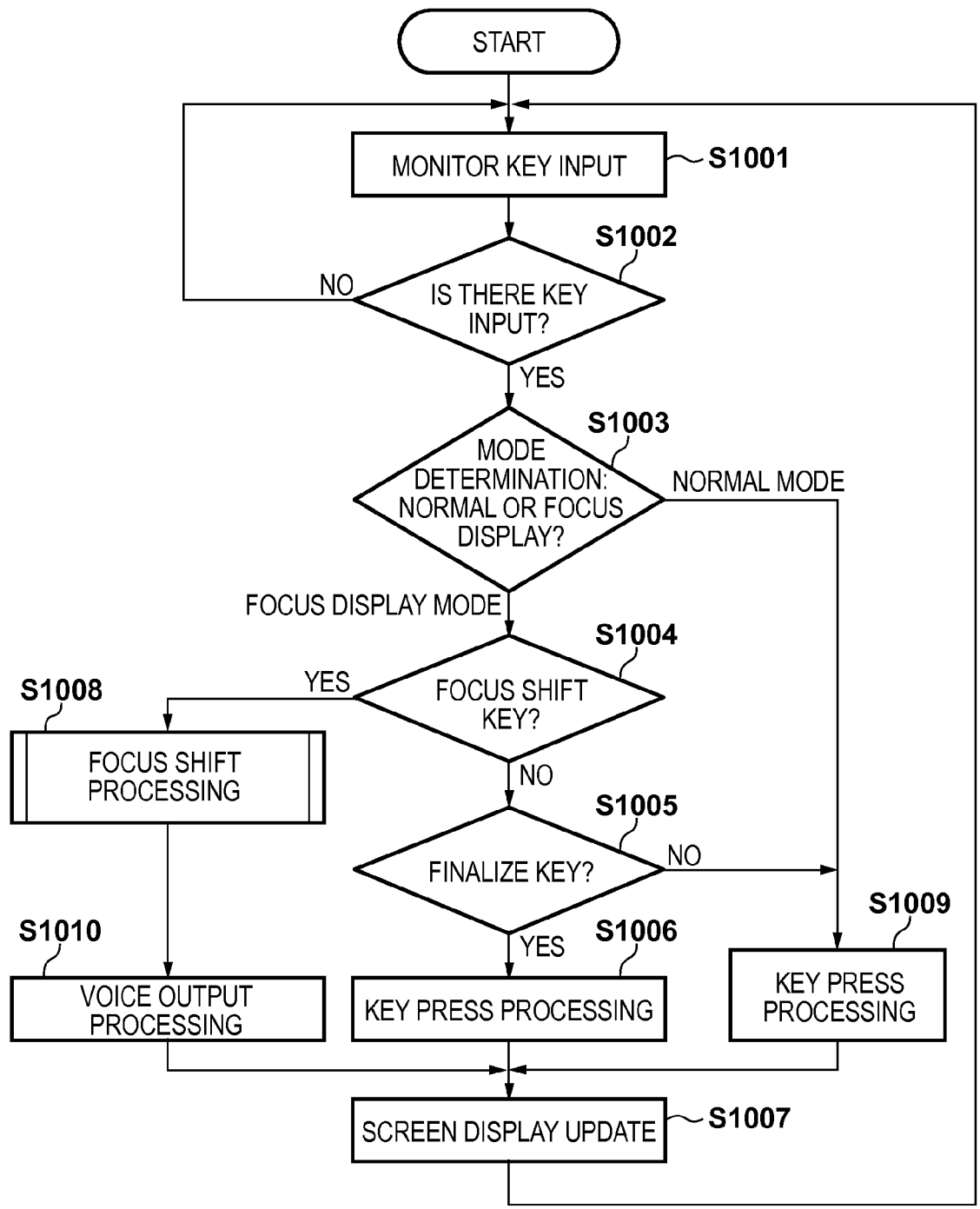
FIG. 10 is a flowchart of processing that an image processing apparatus 501 performs.

Next, an explanation is given for processing that the image processing apparatus 501 performs when, after displaying on the LCD 115 the operation screen based on the response data provided from the server 502, there is input of an operation from the user to the operation screen, using a flowchart of FIG. 10 that illustrates the processing.

<Step S1001>

The CPU 101 monitors whether any of the buttons included in the hard keys 113 has been pressed. If any button has been pressed, the processing proceeds to step S1003 via step S1002, and if no button has been pressed, the processing waits in step S1001.

<Step S1003>

The CPU 101 determines whether the current mode is the focus mode (focus display mode) or the non-focus mode (normal mode). As a result of this determination, if the current mode is the focus mode, the processing proceeds to step S1004, and if it is the non-focus mode the processing proceeds to step S1009.

<Step S1004>

The CPU 101 determines whether a pressed button is a button for causing the focus to shift. For example, if the button 204 is used as a button for shifting the focus in a backward direction, and the button 206 is used as a button for shifting focus in a forward direction, it is determined whether the pressed button was either of the buttons 204, 206.

As a result of this determination, if the pressed button is a button for shifting of the focus, the processing proceeds to step S1008. However, if the pressed button is not a button for shifting the focus, the processing proceeds to step S1005.

<Step S1005>

The CPU 101 determines whether the pressed button is a button that instructs a software key that is currently the focus target. For example, in a case in which the button 205 is the button that instructs the software key that is currently the focus target, it is determined whether the pressed button is the button 205.

As a result of this determination, if the pressed button is a button to instruct the software key that is the current focus target, the processing proceeds to step S1006. However, if the pressed button is not the button to instruct the software key that is the current focus target, the processing proceeds to step S1009.

<Step S1006>

The CPU 101 then executes processing assigned to the software key that is currently the focus target. This processing to be executed is the same as processing that is performed when the user directly touches the software key on the touch panel 112.

<Step S1007>

The CPU 101 performs processing to update the display screen of the LCD 115. This is processing for, when a modification operation for a setting value or a modification operation for screen display has been performed via a touch operation on the touch panel 112 or an operation on the hard keys 113, reflecting that on the display screen of the LCD 115.

<Step S1008>

The CPU 101 performs processing for shifting the focus in a direction corresponding to the pressed button. Details of processing in step S1008 are explained later using the flowchart of FIG. 11.

<Step S1009>

The CPU 101 executes processing corresponding to the pressed button. For example, if the current mode is the normal mode, when a key on the numeric keypad is pressed, input processing for the numeric value assigned to that key is executed.

<Step S1010>

The CPU 101 refers to the CSS data 911 designated by the CSS designation section 901 in the HTML data corresponding to the operation screen currently displayed on the LCD 115. Next, the CPU 101 extracts the character string designated by "voice" in the voice character string designation section 912 corresponding to the ID of the focus target software key that is the destination of the shift by the processing in step S1008. Then the CPU 101 performs processing to cause output of the voice based on the extracted character string from the speaker 118.

Figure 11:
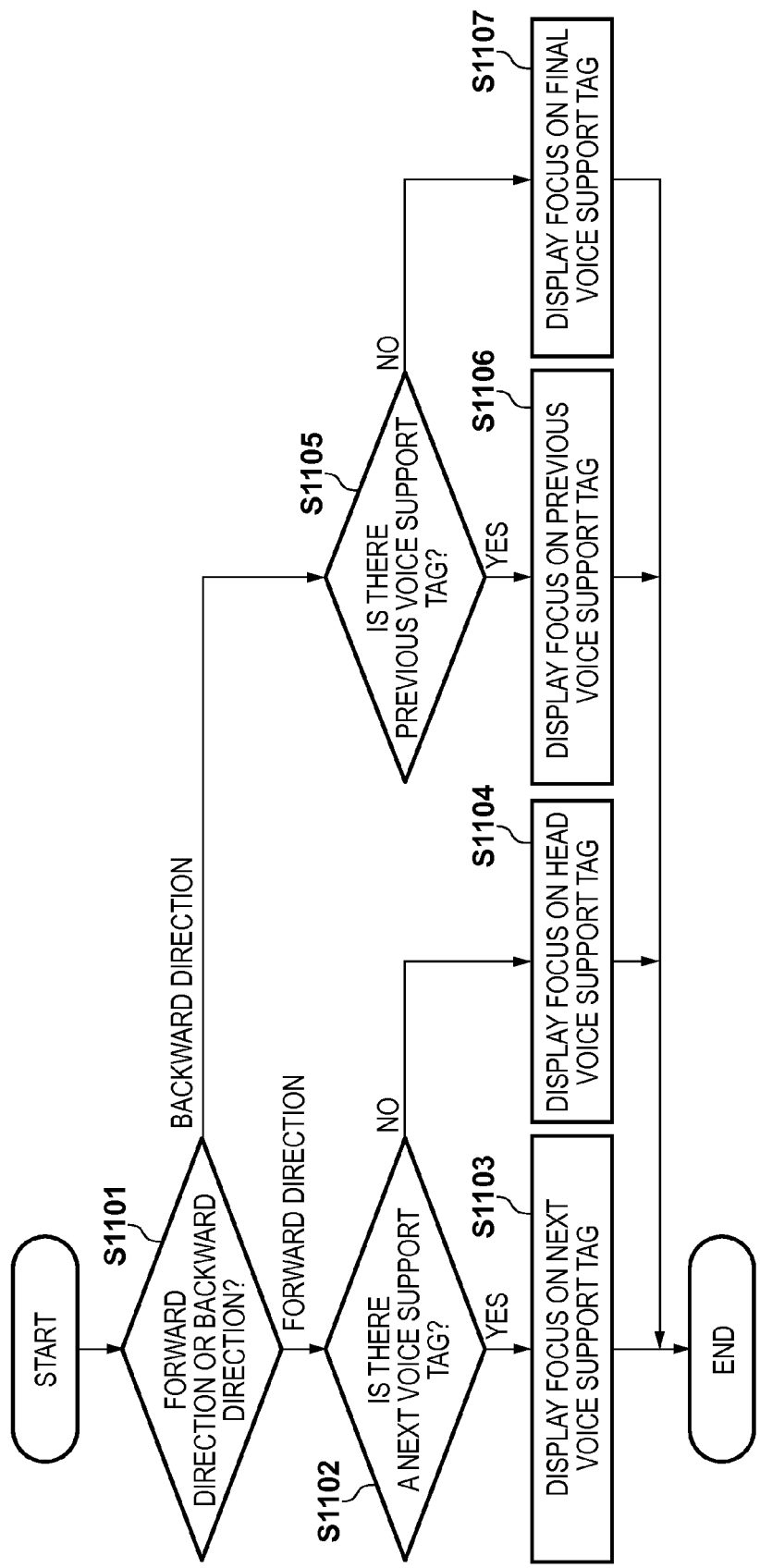
FIG. 11 is a flowchart showing details of processing in step S1008.

Next, regarding the details of the process in the above step S1008, explanation is given using FIG. 11, which shows a flowchart of the processing.

<Step S1101>

The CPU 101 determines whether a button for shifting the focus in the forward direction has been pressed, or whether a button for shifting the focus in the backward direction has been pressed. As a result of this determination, if the button for shifting the focus in the forward direction was pressed the processing proceeds to step S1102, and if the button for shifting the focus in the backward direction was pressed, the processing proceeds to step S1105.

<Step S1102>

The CPU 101 refers to the HTML data corresponding to the operation screen displayed on the LCD 115. The CPU 101 then determines whether there exists a software key, to which a description for adding the border line such as STYLE="border: 5px #ff0000 solid" is added, following the software key which is currently the focus target in the forward direction. If the result of this determination is that it is present, the processing proceeds to step S1103; if it is not present the processing proceeds to step S1104.

<Step S1103>

The CPU 101 then moves the focus to the software key to which a description for adding the border line, such as STYLE="border: 5px #ff0000 solid", is added following the software key which is currently the focus target in the forward direction.

<Step S1104>

The CPU 101 specifies software keys for which a description for adding a border line, such as STYLE="border: 5px #ff0000 solid" is present, out of the respective software keys defined in the HTML data. The CPU 101 then specifies the software key that is defined closest to the start of the HTML data from specified software keys as a target. The focus is then caused to move to the software key specified as the target.

<Step S1105>

The CPU 101 refers to the HTML data corresponding to the operation screen displayed on the LCD 115. The CPU 101 then determines whether there exists a software key, to which a description for adding the border line such as STYLE="border: 5px #ff0000 solid", following the software key which is currently the focus target in the backward direction. If the result of this determination is that it is present, the processing proceeds to step S1106; if it is not present the processing proceeds to step S1107.

<Step S1106>

The CPU 101 then moves the focus to the software key to which the description for adding the border line, such as STYLE="border: 5px #ff0000 solid", is present next to the software key, which is currently the focus target, in the backward direction.

<Step S1107>

The CPU 101 specifies the software keys, for which a description for adding a border line such as STYLE="border: 5px #ff0000 solid" is present, out of the respective software keys defined in the HTML data. The CPU 101 then specifies the software key defined closer to the end of the HTML data from the specified software keys as a target. The focus is then caused to shift to the software key specified as the target.

Note that if the focus moves in any of step S1103, step S1104, step S1106 or step S1107, then the highlight target also switches.

In this way, by virtue of the present embodiment, in addition to being able to realize voice read-out with respect to a Web application displayed on a Web browser that operates on the MFP, operability of other applications that operate on the MFP is unified. Accordingly, by realizing voice read-out upon operation of a display screen displayed on the Web browser according to an operation on an operation unit on the MFP, it is possible to unify behavior with respect to other applications that operate on the MFP. It is also possible to realize a smooth voice read-out function without causing the user to be conscious of differences in application form.

Additionally, in the above-described explanation, explanation was given of an example voice outputting an explanation in accordance with a software key, but the target of voice output is not limited to just software keys, and may be another target. For example, every time the screen displayed on the LCD 115 is switched, voice output of an explanation corresponding to the switched screen may be performed (for example, voice output of "the current screen is the copy setting screen"). In addition, as above, because voice output is executed when the focus mode is set, configuration may be taken such that when the current mode switches to the focus mode, voice output of a message to the effect that voice output is starting because the current mode is the focus mode, such as "Transitioned to the focus display mode. Voice guide will start." may be performed. In addition to this, configuration may be taken to perform voice output of a key operation explanation in the focus mode, as in "The focus is shifted by the numbers 4 and 6. Finalization is performed by the number 5."

In this embodiment, the server 502 was explained as a Web server that transmits/receives a request/response in accordance with the HTTP protocol. However, it may be an apparatus other than the Web server, if it is an apparatus capable of providing information for voice output corresponding to an operation screen on the image processing apparatus 501 and 1 or more software keys included in the operation screen, as above.

In other words, the image processing apparatus explained above receives data of an operation screen that includes a plurality of components from the server, and displays the operation screen based on the received data. The image processing apparatus causes the focus to shift to one of the above-described plurality of components in accordance with an operation by the user, and obtains content of voice output defined by the above-described data that is associated with the component that is the shift destination of the focus. Furthermore, the image processing apparatus is an example of an apparatus that performs voice output based on the obtained content of voice output.

[Second Embodiment]

In this embodiment, when the image processing apparatus displays the main menu, on which icons of various executable applications are displayed in a list, on the LCD 115, control is performed as follows. In other words, a display form of an icon corresponding to each of an application that supports voice and an application that does not support voice are made to be different.

Figure 12:
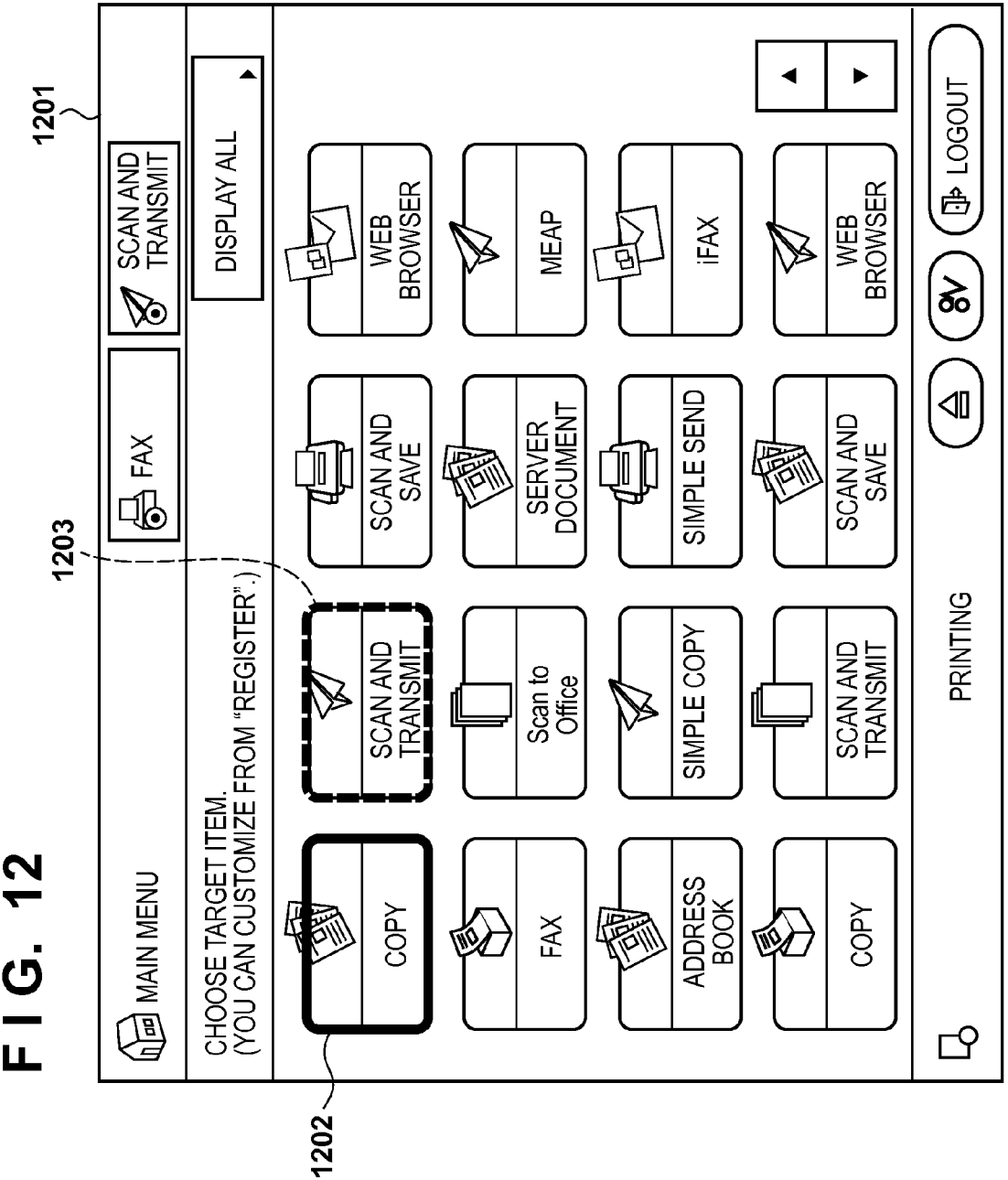
FIG. 12 is a view for illustrating an example of a main menu.

An example of the main menu displayed on the LCD 115 is shown in FIG. 12. The main menu is, for example, displayed when the user presses a button (not shown) (for example, a main menu key). As shown in FIG. 12, icons corresponding to each application that the image processing apparatus can execute are displayed in a list in a main menu 1201. When a user touches any one icon or uses the hard keys 113 to shift the focus to any one icon and then accordingly inputs a finalize instruction, a corresponding application is executed. In other words, each icon is a shortcut button (shortcut button of the Web browser) for accessing the corresponding application.

In this embodiment, when icons are displayed as a list in this way, it is checked whether the applications corresponding to the respective icons support voice. The icons corresponding to applications that support voice are enabled (instruction is possible), and icons corresponding to applications that do not support voice are disabled (instruction not possible). The approach to displaying is made to be different for enabled icons and disabled icons. In the example of FIG. 12, an icon corresponding to a "copy" application (icon in the top-left) is enabled because the "copy" application supports voice, and furthermore a border 1202 that has solid lines is added to the icon. Meanwhile, regarding an icon corresponding to a "scan and transmit" application (the icon immediately to the right of the icon corresponding to the "copy" application), the "scan and transmit" application does not support voice. For this reason, it is disabled, and furthermore a border 1203 that has a dotted line is added to the icon.

Of course, it is good if the approach to displaying differentiates the icons corresponding to applications that support voice from the icons corresponding to applications that do not support voice. Therefore, for example, the approach to displaying each icon, such as reducing the brightness of an icon corresponding to an application that does not support voice and then displaying, is not limited to the approach to displaying shown in FIG. 12. In addition, the icons corresponding to applications that do not support voice may be set as non-displayed.

Figure 13:
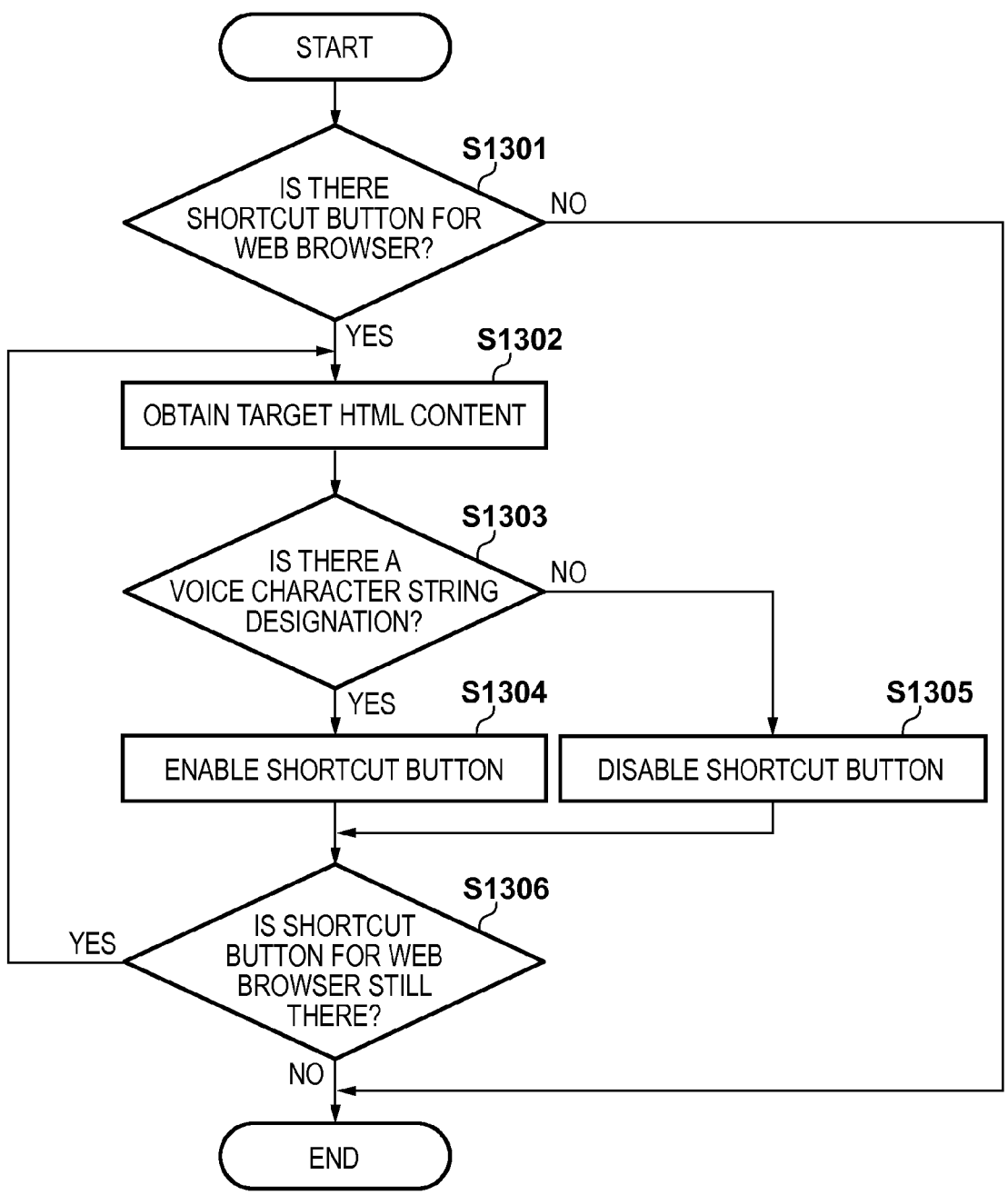
FIG. 13 is a flowchart of processing that the image processing apparatus performs.

Regarding processing that the image processing apparatus performs to display the main menu, FIG. 13, which shows a flowchart of the processing, is used to explain it. Processing in accordance with the flowchart of FIG. 13 is started in accordance with input of an instruction to display the main menu.

<Step S1301>

The CPU 101 determines whether data of icons of various applications that are executable on the image processing apparatus is included in data of the main menu. As a result of the determination, the processing proceeds to step S1302 if it is included, and if it is not included, the processing according to the flowchart of FIG. 13 completes, and, as normal, the main menu is displayed on the LCD 115 based on data of the main menu.

<Step S1302>

The CPU 101 selects one piece of unselected icon data from the icon data included in data of the main menu. The CPU 101 then accesses a URL included in the selected icon data, and obtains data (HTML content) that defines a corresponding application.

<Step S1303>

The CPU 101 determines whether the voice character string designation section 912 is present in the HTML content obtained in step S1302. If the result of this determination is that it is present, the processing proceeds to step S1304; if it is not present the processing proceeds to step S1305.

<Step S1304>

The CPU 101 enables the icon selected in step S1302, and accepts an instruction operation to the icon via the touch operation or the hard keys 113.

<Step S1305>

The CPU 101 disables the icon selected in step S1302, and does not accept an instruction operation to the icon via the touch operation or the hard keys 113.

<Step S1306>

The CPU 101 determines whether data of all icons included in the main menu data has been selected in step S1302. As a result of this determination, when data of all icons is selected, the processing in accordance with the flowchart of FIG. 13 completes. The main menu is displayed on the LCD 115 based on the data of the main menu, but enabled icons are displayed in a display form in which they can be instructed, and in addition, disabled icons are displayed in a display form in which they cannot be instructed. In the display form that allows instruction, icons may be displayed as normal, or icons may be displayed with a border or the like added thereto. Meanwhile, in the display form where it cannot be instructed, configuration may be taken to display the icon with a luminance lower than a normal luminance, or configuration may be taken to display an image, such as an "x", that overlaps the icon so as to notify that instruction is inhibited. Of course, as described above, configuration may be taken to make disabled icons non-displayed.

Meanwhile, if icon data that is not selected yet in step S1302 from icon data included in the main menu data still remains, the processing returns to step S1302.

In this way, by virtue of the present embodiment, before accessing the Web application from the Web browser, performance of a confirmation of whether a target Web application supports voice read-out is realized. Accordingly, before accessing a Web application, the user can confirm whether that Web application supports voice read-out, and it is possible to prevent accessing an application that does not support voice read-out and becoming lost in operation thereof.

[Third Embodiment]

Although explanation was given of communication by the HTTP protocol in the first embodiment and the second embodiment as an example, limitation is not made to this, and for example communication may be by an HTTPS protocol. Limitation is not made to HTML data, and for example, XML data may be used.

In the first embodiment and the second embodiment, the server 502 was handled as an apparatus separate from the image processing apparatus 501, but the server 502 may be handled as an apparatus in the image processing apparatus 501.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-209396, filed Oct. 10, 2014 which is hereby incorporated by reference herein in its entirety.

What is claimed is:

1. An image processing apparatus comprising:
a memory; and
a processor connected to the memory and configured to execute instructions, that when executed, cause the image processing apparatus to:
transmit a request for data of an operation screen to a Web server;
receive from the Web server, as a response to the request, the data of the operation screen, wherein the operation screen includes a plurality of software keys, and wherein the data of the operation screen includes voice data associated with each of one or more of the plurality of software keys;
display the operation screen based on the received data of the operation screen;
designate a particular software key of the plurality of software keys in the displayed operation screen in accordance with an operation performed on the operation screen; and
output a voice signal based on the voice data associated with the designated software key.

2. The image processing apparatus according to claim 1, wherein the processor is further configured to execute instructions to
add a description indicating an ability to become a designation target to a description that defines a software key for which voice data is defined, based on the received data of the operation screen
and designate one of software keys to which the description indicating the ability to become the designation target is added, in accordance with the operation performed on the operation screen.

3. The image processing apparatus according to claim 1, wherein the processor is further configured to execute instructions to
set either a first mode in which the designated software key is highlighted, or a second mode in which the designated software key is not highlighted;
wherein the outputted voice signal indicates that the first mode is set when the first mode is set.

4. The image processing apparatus according to claim 1, wherein the processor is further configured to execute instructions to:
for each of the plurality of software keys, obtain voice data corresponding to the respective software key by accessing a URL corresponding to the respective software key; and
software key, from the plurality of software keys, for which voice data is defined, to be possible to instruct, and to set a software key, from the plurality of software keys, for which voice data is not defined to be possible to instruct.

5. The image processing apparatus according to claim 4, wherein
the displayed operation screen displays, using a display form being indicative of being possible to instruct, a software key for which voice data is defined.

6. The image processing apparatus according to claim 4, wherein
the displayed operation screen displays, using a display form being indicative of being impossible to instruct, a software key for which voice data is not defined.

7. The image processing apparatus according to claim 4, wherein
the displayed operation screen sets the software key for which voice data is not defined to be non-displayed.

8. The image processing apparatus according to claim 1, wherein the image processing apparatus is an MFP (Multi Function Peripheral).

9. A method of controlling an image processing apparatus, the method comprising:
transmitting a request for data of an operation screen to a Web server;
receiving from the Web server, as a response to the request, the data of the operation screen, wherein the operation screen includes a plurality of software keys, and wherein the data of the operation screen includes voice data associated with each of one or more of the plurality of software keys;
displaying the operation screen based on the received data of the operation screen;
designating one of the plurality of software keys in the displayed operation screen in accordance with an operation performed on the operation screen; and
outputting a voice signal based on the voice data associated with the designated software key.

10. A non-transitory computer-readable storage medium that stores a program for causing a computer to execute a method of controlling an image processing apparatus,
wherein the program causes the computer to execute:
transmitting a request for data of an operation screen to a Web server;

receiving from the Web server, as a response to the request, the data of the operation screen, wherein the operation screen includes a plurality of software keys, and wherein the data of the operation screen includes voice data associated with each of one or more of the plurality of software keys;

displaying the operation screen based on the received data of the operation screen;

designating one of the plurality of software keys in the displayed operation screen in accordance with an operation performed on the operation screen; and outputting a voice signal based on the voice data associated with the designated software key.

* * * * *